United States Patent [19]
Saito et al.

[11] Patent Number: 5,838,531
[45] Date of Patent: Nov. 17, 1998

[54] POLARIZABLE ELECTRODE FOR ELECTRIC DOUBLE-LAYER CAPACITOR, AND ELECTRIC DOUBLE-LAYER CAPACITOR USING POLARIZABLE ELECTRODE

[75] Inventors: Kazuo Saito; Atsushi Hagiwara; Toshiharu Okamoto, all of Tokyo, Japan

[73] Assignee: Nisshinbo Industries, Inc., Tokyo, Japan

[21] Appl. No.: 672,602

[22] Filed: Jun. 28, 1996

Related U.S. Application Data

[63] Continuation-in-part of Ser. No. 344,711, Nov. 18, 1994, abandoned.

[30] Foreign Application Priority Data

Jun. 12, 1993 [JP] Japan ................................. 5-339728

[51] Int. Cl.$^6$ ................................. H01G 9/00; H01G 9/04
[52] U.S. Cl. ..................... 361/502; 361/508; 361/512; 361/516; 429/27; 429/30; 429/209
[58] Field of Search ..................... 361/502, 503, 361/522, 523, 541, 528, 532, 512, 525, 508, 516, 504, 521; 429/27, 29, 30, 35, 36, 209, 129, 132, 137, 40–46, 38, 39, 192, 246, 247; 252/502, 62.2, 506, 503, 507–510

[56] References Cited

U.S. PATENT DOCUMENTS

4,522,895  6/1985  Shigeta et al. ................................. 429/44

*Primary Examiner*—Bot L. Ledynh
*Assistant Examiner*—Anthony Dinkins
*Attorney, Agent, or Firm*—Kubovcik & Kubovcik

[57] ABSTRACT

The present invention provides; (1) a polarizable electrode for an electric double-layer capacitor, which includes a solid activated carbon obtained by pyrolyzing a mixture mainly containing an activated carbon and a thermosetting resin and which has, on the surface and/or inside, holes free from the solid activated carbon, and holes having a diameter of 5 $\mu$m–70 $\mu$m possessing a capacity of 0.01 cc/g–1.0 cc/g; (2) a process for producing the above polarizable electrode for an electric double-layer capacitor, which includes heat-treating, as necessary, a mixture mainly containing an activated carbon, a thermosetting resin and a fiber capable of vaporizing upon heating and then pyrolyzing the resulting materiall and (3) an electric double-layer capacitor including at least a pair of the above polarizable electrodes for an electric double-layer capacitor and an electroyte impregnated between the polarizable electrodes. The above polarizable electrode for an electric double-layer capacitor is free from the drawbacks of conventoinal polarizable electrodes, has a low internal resistance and can be charged with or can discharge a large electric current of several amperes to several hundreds of amperes momentarily.

11 Claims, 3 Drawing Sheets

POLARIZABLE ELECTRODE FOR ELECTRIC DOUBLE-LAYER CAPACITOR, AND ELECTRIC DOUBLE-LAYER CAPACITOR USING POLARIZABLE ELECTRODE

This application is a continuation-in-part of application Ser. No. 08/344,711, filed on Nov. 18, 1994, now abandoned.

BACKGROUND OF THE INVENTION

1. Field of the Invention

The present invention relates to a polarizable electrode for electric double-layer capacitor, a process for an producing said polarizable electrode, and an electric double-layer capacitor using said polarizable electrode.

2. Description of the Prior Art

Electric double-layer capacitors are in use in the form of a small but large capacitance capacitor as a backup electric source for memory of microcomputer, etc. Electric double-layer capacitors commercialized currently, however, have a high internal resistance and allow for charging and discharging of only up to about several milliamperes. Hence, it is desired to develop an electric double-layer capacitor having a low internal resistance, and capable of being charged with or discharging a large electric current of several amperes to several hundreds of amperes momentarily.

With respect to the polarizable electrode for use in electric double-layer capacitor, capable of being charged with or discharging a large electric current, there have hitherto been made various proposals. There were proposed, for example, a paste-like polarizable electrode obtained by mixing an activated carbon powder and an electrolyte [Japanese Patent Application Kokai (Laid-Open) No. 102914/1989] and a polarizable electrode using an activated carbon fiber [Japanese Patent Application Kokai (Laid-Open) No. 141629/1991]. These polarizable electrodes using an activated carbon powder or an activated carbon fiber, however, have a high internal resistance owing to the weak contact between activated carbon particles, or cause reduction in capacity owing to the falling off of powder or detachment of fiber.

Hence, there was proposed a polarizable electrode obtained by pyrolyzing a mixture of an activated carbon powder and a phenol in an inert atmosphere [Japanese Patent Application Kokai (Laid-Open) No. 288361/1992]. In this polarizable electrode, however, an electrolyte is unable to infiltrate sufficiently into the electrode when the electrode is thick and, as a result, the capacitor assembled with the electrode has an increased internal resistance. There was also proposed an activated porous carbon material obtained by pyrolyzing a phenol foam having cells perpendicular to the electrode surface and then activating the resulting material [Japanese Patent Application Kokai (Laid-Open) No. 177713/1992]. In this polarizable electrode obtained by activating a carbon foam of block form, there are no increase in internal resistance and the falling-off of powder; however, the activation remains only at the surface and it is impossible to make the large electrostatic capacity per unit volume or unit weight.

Further, a very small amount of the alkali metal or alkaline earth metal contained in the foam as a foaming agent, when the electrode is assembled into a capacitor, shortens the cycle life of the capacitor.

OBJECT AND SUMMARY OF THE INVENTION

The object of the present invention is to provide a polarizable electrode for an electric double-layer capacitor, which is free from the above-mentioned drawbacks of the prior art and which has a low internal resistance and can be charged with or discharge a large electric current of several amperes to several hundreds of amperes momentarily; a process for producing such a polarizable electrode; and an electric double-layer capacitor using such a polarizable electrode.

In the course of a study to achieve the above objects, the present inventors thought of an idea that a polarizable electrode having holes on the surface and/or inside can easily be impregnated with an electrolyte and enables easy migration of the ion in said electrode and, as a result, such an electrode has a low internal resistance even though it has a large thickness and need not contain any foaming agent (e.g. alkali metal or alkaline earth metal), whereby an electric double-layer capacitor having a long cycle life may be provided. The present inventors made a further study based on the idea and completed the present invention.

The present invention provides:

a polarizable electrode for an electric double-layer capacitor, which comprises a solid activated carbon obtained by pyrolyzing a mixture mainly containing an activated carbon and a thermosetting resin and which has, on the surface and/or inside, holes free from said solid activated carbon, and holes having diameter of 5 $\mu$m–70 $\mu$m possess capacity (i.e., volume) of 0.01 cc/g–0.1 cc/g, a process for producing the above polarizable electrode for an electric double-layer capacitor, which comprises heat-treating, as necessary, a mixture mainly containing an activated carbon, a thermosetting resin and a fiber capable of vaporizing upon heating, to vaporize said fiber and then pyrolyzing the resulting material, and an electric double-layer capacitor comprising at least a pair of the above polarizable electrodes and an electrolyte impregnated between said polarizable electrodes.

DETAILED DESCRIPTION OF THE INVENTION

The present invention is hereinafter described in detail.

The activated carbon used in the present invention is not particularly restricted with respect to the type and includes those obtained by carbonizing a natural fiber (e.g. sawdust or coconut husk), an aromatic polycyclic compound present in coal, petroleum or the like, or a synthetic resin of phenolic resin type, acrylic resin type, aromatic polyamide type, cellulose type or the like and then activating the resulting material by an ordinary method. The form of the activated carbon may be any of a powder, granules, a fiber, etc. The specific surface area of the activated carbon has no particular restriction, either but is preferable 500 $m^2/g$ or more.

The thermosetting resin used in the present invention is not particularly restricted with respect to its composition and includes known resins such as polycarbodiimide resin, phenolic resin, furan resin, epoxy resin and the like.

The fiber capable of vaporizing upon heating, used in the present invention is not particularly restricted and can be any synthetic or natural fiber capable of vaporizing at the heat-treating temperature or pyrolyzing temperature adopted in the process (described later) for producing a polarizable electrode for an electric double-layer capacitor according to the present invention. The fiber can be exemplified by a polyvinyl alcohol, a polyethylene, a polystyrene, a polypropylene, a polyester, a polyethylene glycol and a cellulose (these are hereinafter abbreviated to "fiber component").

In producing the polarizable electrode of the present invention for an electric double-layer capacitor, there is first prepared an activated carbon mixture by mixing an activated carbon, a thermosetting resin and a fiber component all mentioned above. In this mixing step, there can be used a known method ordinarily used in the mixing of such components, for example, a stirring rod, a kneader, a ball mill, a static mixer and a ribbon mixer.

The proportions of the activated carbon and the fiber component can be determined depending upon, for example, the intended properties of the polarizable electrode to be produced. For example, the proportion of the activated carbon is 100 parts by weight and the proportion of the fiber component is 0.01–100 parts by weight, preferable 0.05–80 parts by weight. When the proportion of the fiber component is less than the range, it may happen that the discontinuous portions of electrode free from any solid activated carbon are blocked owing to the shrinkage of electrode during the pyrolyzing step described later and, as a result, the electrode is not well impregnated with an electrolyte and has a high internal resistance. Conversely when the proportion of the fiber component is more than the range, it may happen that the electrode has a low strength and is unable to withstand actual use.

The proportions of the activated carbon and the thermosetting resin can also be determined depending upon, for example, the intended properties of the polarizable electrode to be produced. For example, the proportion of the activated carbon is 100 parts by weight and the proportion of the thermosetting resin is 0.5–100 parts by weight, preferable 1–50 parts by weight.

Depending upon the case, there may be used, in addition to the above components, an electrically conductive agent such as expanded graphite, graphite, carbon black, ketjen black, carbon whiskers, metal powder and the like.

The above-prepared activated carbon mixture is then molded, as necessary, into a desire shape. This molding step can be conducted by a conventionally known method such as pressure molding, hydrostatic molding, extrusion molding, injection molding, belt pressing, roll pressing or the like. Incidentally, this molding step can be omitted depending upon the shape of the activated carbon mixture.

The molded activated carbon mixture is heat-treated to vaporize the fiber component present therein. The atmosphere used in this step may be a conventionally known gas, for example, at least one gas selected from non-oxidizing gases such as vacuum, argon, hydrogen and the like, or from oxidizing gases such as air, carbon dioxide, oxygen, propane gas and the like. The heat-treatment temperature used in this step can be determined depending upon, for example, the thermal decomposabilities of the fiber component, activated carbon and thermosetting resin present in the activated carbon mixture, but is, for example, 100°–600° C., preferable 150°–550° C.

The heat-treatment step may be omitted because it is conducted to vaporize the fiber component beforehand to shorten the time of the pyrolyzing step described later.

The material obtained by the heat-treatment step is then pyrolyzed. This pyrolyzing step can be conducted by any conventionally known method in, for example, a non-oxidizing atmosphere such as vacuum, argon, hydrogen or the like. The pyrolyzing temperature has no upper limit but the pyrolyzing is conducted for example, at 600°–3,000° C., preferably at 700°–1,500° C. Pyrolyzing at temperatures higher than 3,000° C. invites severe oxidation and wastage of kiln and is not realistic. Pyrolyzing at temperatures lower than 600° C. gives an electrode of high internal resistance and of small capacity.

The material obtained by the pyrolyzing step is cut into a desired shape to obtain a polarizable electrode for electric double-layer capacitor. The cutting can be made by any conventionally known method such as cutting by cutter, cutting by ultrasonic wave, or the like.

The cutting may be conducted not after the pyrolyzing step but after or before the heat-treatment step, or may be omitted depending upon the shape of the activated carbon mixture.

The thus-obtained polarizable electrode for electric double-layer capacitor according to the present invention comprises a solid activated carbon obtained by pyrolyzing a mixture mainly containing an activated carbon and a thermosetting resin and has, on the surface and/or inside, holes free from said solid activated carbon. Herein, the holes are formed by the vaporization of the fiber component, or by the deformation or compression of the holes, etc. formed as above, occurring as a result of the shrinkage of the activated carbon mixture during its heat-treatment or pyrolyzing.

In the present invention, there is used a fiber component as the component capable of vaporizing upon heating, and the fiber component has a high aspect ratio and tends to align in one direction owing to the pressure applied during molding. Therefore, when the activated carbon mixture is heat-treated to vaporize the fiber component and the resulting material is pyrolyzed in an inert gas, the resulting polarizable electrode has holes having a shape corresponding to the shape of the fiber component.

Depending upon the direction of the cutting conducted after heat treatment or pyrolyzing, the polarizable electrode can have holes each having a direction parallel or nearly parallel, or perpendicular or nearly perpendicular to the electrode surface and thereby can easily be impregnated with an electrolyte.

Figures 1, 2:
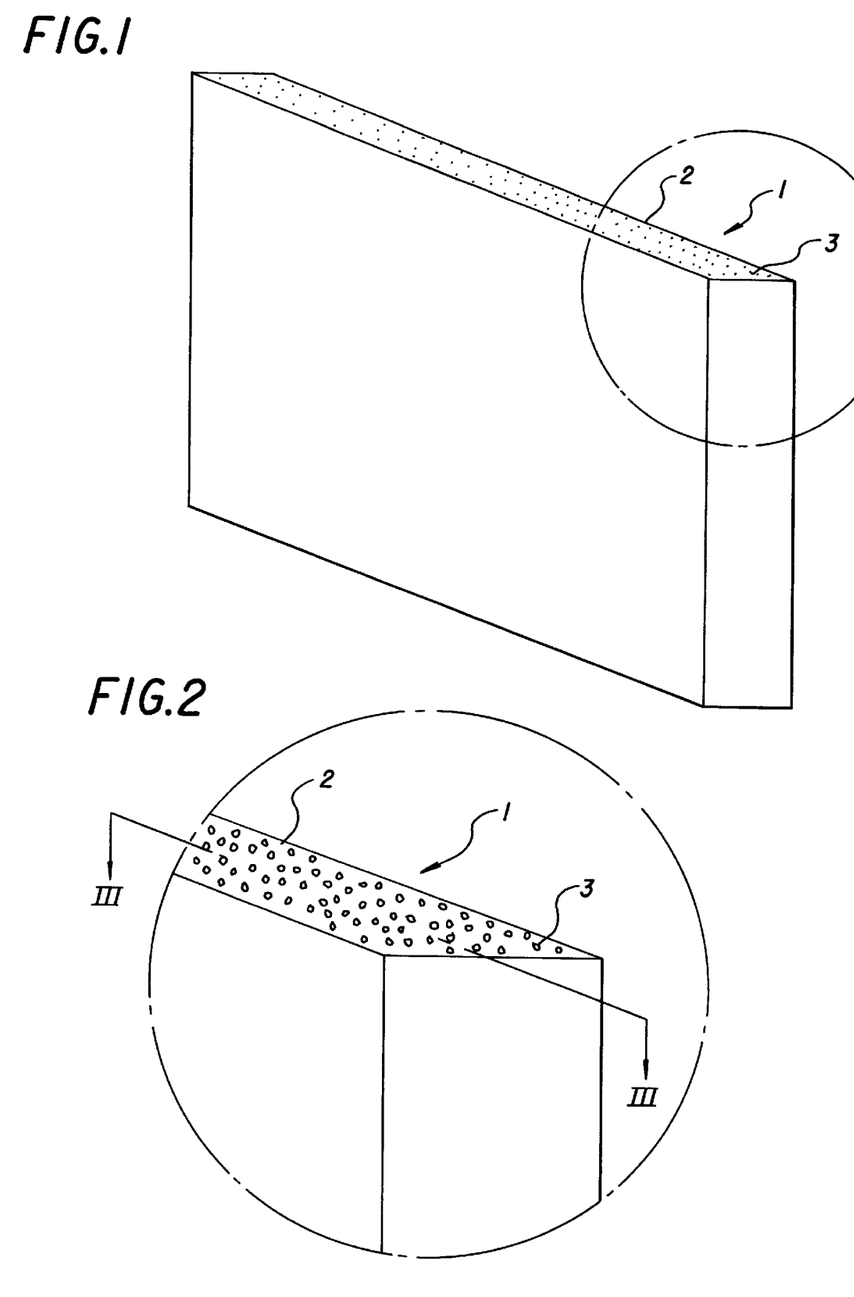
FIG. 1 illustrates a polarizable electrode for electric double-layer capacitor of the present invention having holes the direction of which is parallel or substantially parallel to the surface of the electrode.
FIG. 2 is an enlarged view of a portion of the polarizable electrode for electric double-layer capacitor shown in FIG. 1.
Figure 3:
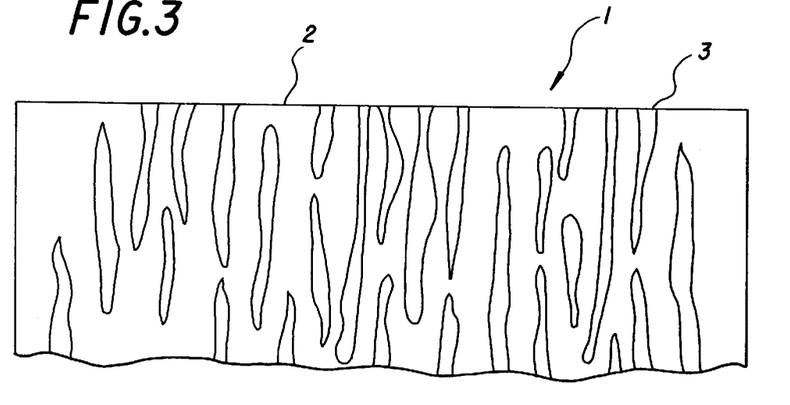
FIG. 3 is a sectional view of the polarizable electrode for electric double-layer capacitor taken along line III—III in FIG. 2.

FIGS. 1, 2 and 3 illustrate a polarizable electrode 1 according to the present invention which is made of solid activated carbon 2 and has holes 3 each having a direction parallel or substantially parallel to the electrode surface.

Figure 4:
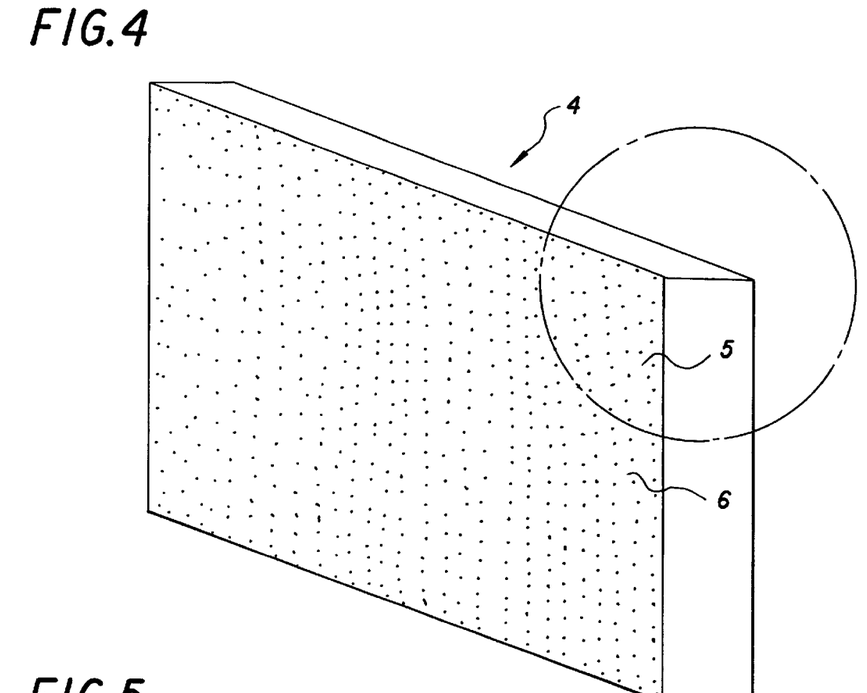
FIG. 4 shows a polarizable electrode for electric double-layer capacitor of the present invention having holes the direction of which is perpendicular or substantially perpendicular to the surface of the electrode.
Figure 5:
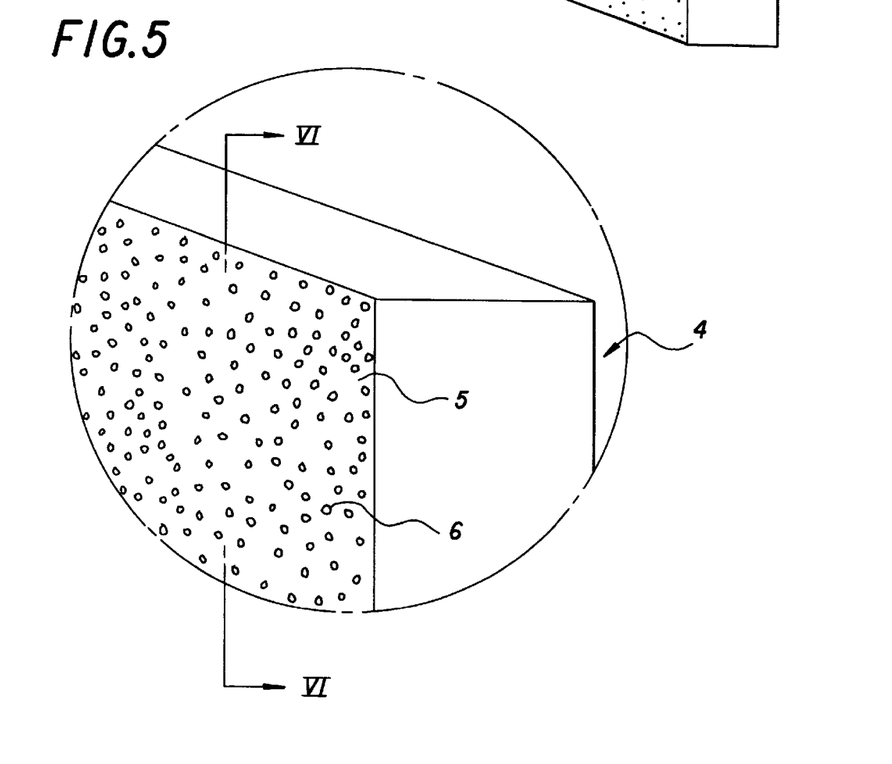
FIG. 5 is an enlarged view of a portion of the polarizable electrode for electric double-layer capacitor shown in FIG. 4.
Figure 6:
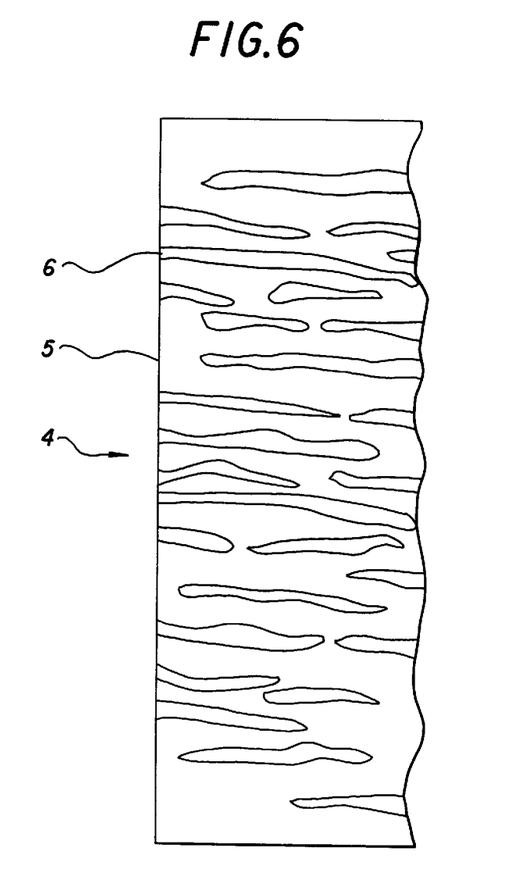
FIG. 6 is a sectional view of the polarizable electrode for electric double-layer capacitor taken along line VI—VI in FIG. 5.

FIGS. 4, 5 and 6 illustrate a polarizable electrode 4 according to the present invention which is made of solid activated carbon 5 and has holes 6 each having a direction parallel or substantially parallel to the electrode surface.

Among the total holes, holes having diameter of 5 $\mu$m–70 $\mu$m possess capacity of 0.01 cc/g–1.0 cc/g, and when the capacity is less than 0.01 cc/g, there arises a problem that easy migration of the ion could not be achieved. When the capacity is more than 1.0 cc/g, there arises a problem that a shape of the electrode could not be maintained. The porosity (the proportion of volume of total holes) in the present polarizable electrode for electric double-layer capacitor is 20–80%.

Diameter and amount of a fiber component should be adjusted with a consideration of shrinkage of the discontinuous portions, such as holes, gaps, dents, grooves, etc., formed by the vaporization of the fiber component, during the heat-treatment or pyrolyzing.

The present polarizable electrode for electric double-layer capacitor has high ion-conductivity which serves to lower the internal resistance. That is, the present polarizable electrode achieves a frequency $\omega_L$ of 100 mHz–500 mHz (when the thickness is 1 mm), which may be used as a yardstick of the ion-conductivity, and corresponds to a shift of impedance frequency character Cole-Cole plat from diffusion impedance region to condenser region.

Figure 7:
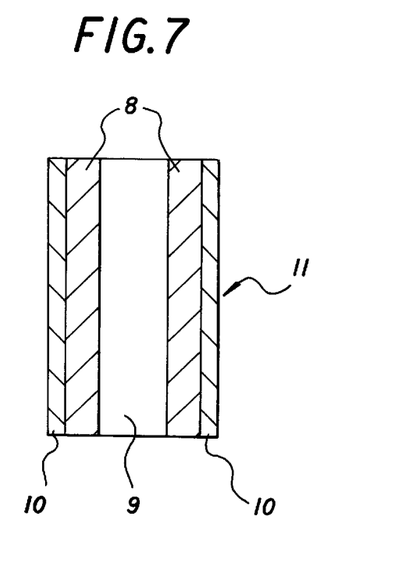
FIG. 7 shows a sectional view of an electric double-layer capacitor.

By using at least a pair of the thus-obtained polarizable electrodes for an electric double-layer capacitor as a positive electrode and a negative electrode, and appropriate electrolyte impregnated between these electrodes, an electric double-layer capacitor having a low internal resistance according to the present invention can be produced. Preferable, these electrodes are firmly bonded to an appropriate collector electrode as shown in FIG. 7. In FIG. 7, the electric double-layer capacitor 11 includes polarizable electrodes 8 according to the invention having an electrolyte (seperator) 9 therebetween and a collector electrode 10 bonded to each polarizable electrode.

As the electrolyte, for example, an organic electrolyte obtained by dissolving an electrolyte such as $LiAsF_6$, $LiBF_4$, $LiPF_6$, $LiClO_4$, tetraalkylammonium, tetrafluoroborate in a solvent such ethylene carbonate, propylene carbonate, butylene carbonate, dimethyl carbonate, $\gamma$-butyrolactone, acetonitrile, 1,2-dimethoxyethane, sulfolane, nitromethane or a mixture thereof, and an aqueous electrolyte obtained by dissolving an electrolyte such as KOH, NaOH, $H_2SO_4$, HCl, $HNO_3$, ZnCl, $ZnBr_2$ in water, can be used.

The present invention is hereinafter described specifically by way of Examples.

Example 1

There were mixed a polycarbodiimide resin poser (average particle diameter=5 $\mu$m), an activated carbon powder (average particle diameter=7 $\mu$m, specific surface area= 1,800 $m^2$/g) and a PVA (polyvinyl alcohol) short fiber (average fiber diameter=75 $\mu$m, average fiber length=1 mm). The mixing ratio of the tree components is shown in Table 1. In Table 1, each number is by parts by weight (this applies also to Table 3, 5, 8, 12 and 15).

TABLE 1

| No. | Activated carbon | Thermosetting resin | PVA short fiber |
|---|---|---|---|
| 1-1 | 100 | 0.5 | 0.01 |
| 1-2 | 100 | 0.5 | 100 |
| 1-3 | 100 | 100 | 0.01 |
| 1-4 | 100 | 100 | 100 |

Each of the above mixtures was stirred in a ball mill for 24 hours: The resulting material was placed in a square mold of 100 mm×100 mm (internal dimension) and subjected to pressure molding at a pressure of 75 kg/$cm^2$ at 130° C. for 5 minutes. The molded article was heat-treated up to 450° C. in the air to vaporize the fiber and then pyrolyzed up to 1000° C. in a nitrogen gas atmosphere. The pyrolyzing product was cut so that the throughholes were perpendicular to the product (electrode) surface, to prepare sheet electrodes (polarizable electrodes) each of 1 mm in thickness. Each electrode was measured for porosity and capacity possessed by the holes having diameter of 5 $\mu$m–70 $\mu$m, by mercury porosimetry. A collector electrode (a vitreous carbon produced by Nisshinbo Industries, Inc. was used as the collector) was bonded to the polarizable electrode by the use of a conductive adhesive. Two same such laminates were used as a positive electrode and a negative electrode and were vacuum-impregnated with a propylene carbonate solution containing 1 mole/liter of tetrabutylammonium perchlorate, whereby electric double-layer capacitors were produced. A constant current of 1 kHz and 10 mA was passed through each capacitor and the voltage between the electrodes was measured to determine the equivalent series resistance of the capacitor. A frequency $\omega_L$ of the each capacitor which corresponds to a shift of impedance frequency character (call-call prot) from diffusion impedance region to condenser region was measured by an impedance meter. The porosity, the capacity possessed by the holes having diameter of 5 $\mu$m–70 $\mu$m, the equivalent series resistance and $\omega_L$ are shown in Table 2.

TABLE 2

| No. | Equivalent series resistance ($\Omega$) | porosity (%) | capacity (cc/g) | $\omega_L$ (mHz) |
|---|---|---|---|---|
| 1-1 | 4.00 | 40 | 0.08 | 115 |
| 1-2 | 0.8 | 80 | 0.6 | 300 |
| 1-3 | 2.00 | 20 | 0.03 | 107 |
| 1-4 | 0.50 | 70 | 0.3 | 253 |

Example 2

There were mixed a phenolic resin powder (average particle diameter=5 $\mu$m), an activated carbon powder (average particle diameter=7 $\mu$m, specific surface area=1, 800 $m^2$/g) and a PVA short fiber (average fiber diameter=75 $\mu$m, average fiber length=1 mm). The mixing ratio of the three components are shown in Table 3.

TABLE 3

| No. | Activated carbon | Thermosetting resin | PVA short fiber |
|---|---|---|---|
| 2-1 | 100 | 0.5 | 0.01 |
| 2-2 | 100 | 0.5 | 100 |
| 2-3 | 100 | 100 | 0.01 |
| 2-4 | 100 | 100 | 100 |

Each of the mixtures was stirred in a ball mill for 24 hours. The resulting material was placed in a square mold of 100 mm×100 mm (internal dimension) and subjected to pressure molding at a pressure of 75 kg/cm² at 130° C. for 5 minutes. The molded article was heat-treated up to 450° C. in the air to vaporize the fiber and then pyrolyzed up to 1000° C. in a nitrogen gas atmosphere. The pyrolyzing product was cut so that the throughholes were parallel to the product (electrode) surface, to prepare sheet electrodes (polarizable electrodes) each of 1 mm in thickness. Each electrode was measured for porosity and capacity possessed by the holes having diameter of 5 μm–70 μm, by mercury porosimetry. A collector electrode (a vitreous carbon produced by Nisshinbo Industries, Inc. was used as the collector) was bonded to the polarizable electrode by the use of a conductive adhesive. Two same such laminates were used as a positive electrode and a negative electrode and were vacuum-impregnated with a propylene carbonate solution containing 1 mole/liter of tetrabutylammonium perchlorate, whereby electric double-layer capacitors were produced. The equivalent series resistance and frequency $\omega_L$ of the capacitor was measured in the same manner as in Example 1. The porosity, the capacity possessed by the holes having diameter of 5 μm–70 μm, the equivalent series resistance and $\omega_L$ are shown in Table 4.

TABLE 4

| No. | Equivalent series resistance (Ω) | porosity (%) | capacity (cc/g) | $\omega_L$ (mHz) |
|---|---|---|---|---|
| 2-1 | 4.20 | 43 | 0.09 | 110 |
| 2-2 | 1.06 | 80 | 0.6 | 280 |
| 2-3 | 2.12 | 20 | 0.03 | 105 |
| 2-4 | 0.53 | 72 | 0.3 | 240 |

Example 3

There were mixed a polycabodiimide resin powder (average particle diameter=5 μm), an activated carbon powder (average particle diameter=7 μm, specific surface area= 1,800 m²/g), a PVA short fiber (average fiber diameter=75 μm, average fiber length=1 mm) and an expanded graphite powder (average particle diameter=10 μm). The mixing ratio of the four components are shown in Table 5.

TABLE 5

| No. | Activated carbon | Polycarbodiimide resin | Expanded graphite | PVA short fiber |
|---|---|---|---|---|
| 3-1 | 100 | 0.5 | 0.01 | 0.01 |
| 3-2 | 100 | 0.5 | 0.01 | 100 |
| 3-3 | 100 | 0.5 | 1000 | 0.01 |
| 3-4 | 100 | 0.5 | 1000 | 100 |
| 3-5 | 100 | 100 | 0.01 | 0.01 |
| 3-6 | 100 | 100 | 0.01 | 100 |
| 3-7 | 100 | 100 | 1000 | 0.01 |
| 3-8 | 100 | 100 | 1000 | 100 |

Each of the mixtures was stirred in a ball mill for 24 hours. The resulting material was placed in a square mold of 100 mm×100 mm (internal dimension) and subjected to pressure molding at a pressure of 75 kg/cm² at 130° C. for 5 minutes. The molded article was heat-treated up to 450° C. in the air to vaporize the fiber and then pyrolyzed up to 1000° C. in a nitrogen gas atmosphere. The pyrolyzing product was cut so that the throughholes were perpendicular to the product (electrode) surface, to prepare sheet electrodes (polarizable electrodes) each of 1 mm in thickness. Each electrode was measured for porosity and capacity possessed by the holes having diameter of 5 μm–70 μm, by mercury porosimetry. A collector electrode (a vitreous carbon produced by Nisshinbo Industries, Inc. was used as the collector) was bonded to the polarizable electrode by the use of a conductive adhesive. Two same such laminates were used as a positive electrode and a negative electrode and were vacuum-impregnated with a propylene carbonate solution containing 1 mole/liter of tetrabutylammonium perchlorate, whereby electric double-layer capacitors were produced. The equivalent series resistance and frequency $\omega_L$ of the capacitor was measured in the same manner as in Example 1. The porosity, the capacity possessed by the holes having diameter of 5 μm–70 μm, the equivalent series resistance and $\omega_L$ are shown in Table 6.

TABLE 6

| No. | Equivalent series resistance (mΩ) | porosity (%) | capacity (cc/g) | $\omega_L$ (mHz) |
|---|---|---|---|---|
| 3-1 | 3000 | 41 | 0.08 | 114 |
| 3-2 | 750 | 79 | 0.6 | 300 |
| 3-3 | 100 | 22 | 0.03 | 108 |
| 3-4 | 25 | 75 | 0.5 | 260 |
| 3-5 | 2700 | 31 | 0.05 | 114 |
| 3-6 | 960 | 80 | 0.6 | 299 |
| 3-7 | 30 | 20 | 0.03 | 106 |
| 3-8 | 7 | 70 | 0.3 | 253 |

Example 4

Using each of the polarizable electrodes prepared in Example 1, a positive electrode and a negative electrode were prepared. They were vacuum-impregnated with an aqueous solution containing 30% by weight of sulfuric acid, whereby electric double-layer capacitors were produced. Each capacitor was determined for equivalent series resistance, and the frequency $\omega_L$ of the capacitor was measured in the same manner as in Example 1. The results are shown in Table 7. Each capacitor was charged with and discharged a current of 200 A and then was observed. The observation results are shown in Table 18.

TABLE 7

| No. | Equivalent series resistance (mΩ) | $\omega_L$ (mHz) |
|---|---|---|
| 4-1 | 65 | 118 |
| 4-2 | 15 | 302 |
| 4-3 | 31 | 109 |
| 4-4 | 8 | 259 |

Example 5

There were mixed a phenolic resin powder (average particle diameter=5 μm), an activated carbon powder (average particle diameter=7 μm, specific surface area=1, 800 m²/g) and a PVA (polyvinyl alcohol) short fiber (average fiber diameter=75 μm, average fiber length=1 mm). The mixing ratio of the three components are shown in Table 8.

TABLE 8

| No. | Activated carbon | Thermosetting resin | PVA short fiber |
|---|---|---|---|
| 5-1 | 100 | 0.5 | 0.01 |
| 5-2 | 100 | 0.5 | 100 |
| 5-3 | 100 | 100 | 0.01 |
| 5-4 | 100 | 100 | 100 |

Each of the above mixtures was stirred in a ball mill for 24 hours. The resulting material was placed in a square mold of 100 mm×100 mm (internal dimension) and subjected to pressure molding at a pressure of 75 kg/cm² at 130° C. for 5 minutes. The molded article was heat-treated up to 450° C. in the air to vaporize the fiber and then pyrolyzed up to 1000° C. in a nitrogen gas atmosphere. The pyrolyzing product was cut so that the throughholes were perpendicular to the product (electrode) surface, to prepare sheet electrodes (polarizable electrodes) each of 1 mm in thickness. Each electrode was measured for porosity and capacity possessed by the holes having diameter of 5 $\mu$m–70 $\mu$m, by mercury porosimetry. A collector electrode (a vitreous carbon produced by Nisshinbo Industries, Inc. was used as the collector) was bonded to the polarizable electrode by the use of a conductive adhesive. Two same such laminates were used as a positive electrode and a negative electrode and were vacuum-impregnated with a propylene carbonate solution containing 1 mole/liter of tetrabutylammonium perchlorate, whereby electric double-layer capacitors were produced. The equivalent series resistance and frequency $\omega_L$ of the capacitor was measured in the same manner as in Example 1. The porosity, the capacity possessed by the holes having diameter of 5 $\mu$m–70 $\mu$m, the equivalent series resistance and $\omega_L$ are shown in Table 9.

TABLE 9

| No. | Equivalent series resistance ($\Omega$) | porosity (%) | capacity (cc/g) | $\omega_L$ (mHz) |
|---|---|---|---|---|
| 5-1 | 6.00 | 40 | 0.09 | 110 |
| 5-2 | 1.20 | 80 | 0.6 | 290 |
| 5-3 | 2.70 | 20 | 0.04 | 102 |
| 5-4 | 0.70 | 70 | 0.3 | 244 |

Example 6

Using sheet electrode produced in Example 1 and corresponds to the electric double-layer capacitor No. 1-2, there were produced electric double-layer capacitor in the same manner as Example 1. The capacitor was measured for equivalent series resistance after 1, 100, 500 and 1,000 cycles in the same manner as in Example 1. The results are shown in Table 10.

TABLE 10

| | Cycles (times) | | | |
|---|---|---|---|---|
| | 1 | 100 | 500 | 1000 |
| Equivalent series resistance ($\Omega$) | 1.00 | 1.01 | 1.01 | 1.02 |

Example 7

Using sheet electrode produced in Example 1 and corresponds to the electric double-layer capacitor No. 1-2, there were produced three electric double-layer capacitor in the same manner as in Example 1. Each capacitor was measured for equivalent series resistance in the same manner as in Example 1. The results are shown in Table 11.

TABLE 11

| | Electrode thickness (mm) | | |
|---|---|---|---|
| | 1 | 3 | 5 |
| Equivalent series resistance ($\Omega$) | 0.8 | 1.0 | 1.2 |

Comparative Example 1

There were mixed a polycabodiimide resin powder (average particle diameter=5 $\mu$m) and an activated carbon powder (average particle diameter=7 $\mu$m, specific surface area=1,800 m²/g). The mixing ratios of the two components are shown in Table 12.

TABLE 12

| No. | Activated carbon | Polycarbodiimide resin |
|---|---|---|
| Comp. Ex. 1-1 | 100 | 0.5 |
| Comp. Ex. 1-2 | 100 | 100 |

Each of the mixtures was stirred in a ball mill for 24 hours. The resulting material was placed in a square mold of 100 mm×100 mm (internal dimension) and subjected to pressure molding at a pressure of 75 kg/cm² at 130° C. for 5 minutes. The molded article was pyrolyzed up to 1000° C. in a nitrogen gas atmosphere. The pyrolyzing product was cut to prepare sheet electrodes (polarizable electrodes) each of 1 mm in thickness. Each electrode was measured for porosity and capacity possessed by the holes having diameter of 5 $\mu$m–70 $\mu$m, by a mercury porosimetry. A collector electrode (a vitreous carbon produced by Nisshinbo Industries, Inc. was used as the collector) was bonded to the polarizable electrode by the use of a conductive adhesive. Two same such laminates were used as a positive electrode and a negative electrode and were vacuum-impregnated with a propylene carbonate solution containing 1 mole/liter of tetrabutylammonium perchlorate, whereby electric double-layer capacitors were produced. The equivalent series resistance and frequency $\omega_L$ of the capacitor was measured in the same manner as in Example 1. The porosity, the capacity possessed by the holes having diameter of 5 $\mu$m–70 $\mu$m, the equivalent series resistance and $\omega_L$ are shown in Table 13.

TABLE 13

| No. | Equivalent series resistance ($\Omega$) | porosity (%) | capacity (cc/g) | $\omega_L$ (mHz) |
|---|---|---|---|---|
| Comp. Ex. 1-1 | 50 | 85 | 2.0 | 53 |
| Comp. Ex. 1-2 | 37 | 10 | 0.005 | 10 |

Comparative Example 2

Using sheet electrode produced in Comparative Example 1 and corresponds to the electric double-layer capacitor No. Comp. 1—1, there were produced three electric double-layer capacitors in the same manner as in Example 1. Each capacitor was measured for equivalent series resistance in the same manner as in Example 1. The results are shown in Table 14.

TABLE 14

| | Electrode thickness (mm) | | |
|---|---|---|---|
| | 1 | 3 | 5 |
| Equivalent series resistance ($\Omega$) | 50 | 70 | 280 |

Comparative Example 3

There were mixed a phenolic resin powder (average particle diameter=5 $\mu$m) and an activated carbon powder (average particle diameter=7 $\mu$m, specific surface area=1,800 m$^2$/g). The mixing ratios of the two components are shown in Table 15.

TABLE 15

| No. | Activated carbon | Phenolic resin |
|---|---|---|
| Comp. Ex. 3-1 | 100 | 0.5 |
| Comp. Ex. 3-2 | 100 | 100 |

Each of the above mixtures was stirred in a ball mill for 24 hours. The resulting material was placed in a square mold of 100 mm×100 mm (internal dimension) and subjected to pressure molding at a pressure of 75 kg/cm$^2$ at 130° C. for 5 minutes. The molded article was pyrolyzed up to 1000° C. in a nitrogen gas atmosphere. The pyrolyzing product was cut to prepare sheet electrodes (polarizable electrodes) each of 1 mm in thickness. Each electrode was measured for porosity and capacity possessed by the holes having diameter of 5 $\mu$m–70 $\mu$m, by a mercury porosimetry. A collector electrode (a vitreous carbon produced by Nisshinbo Industries, Inc. was used as the collector) was bonded to the polarizable electrode by the use of a conductive adhesive. Two same such laminates were used as a positive electrode and a negative electrode and were vacuum-impregnated with a propylene carbonate solution containing 1 mole/liter of tetrabutylammonium perchlorate, whereby electric double-layer capacitors were produced. The equivalent series resistance and frequency $\omega_L$ of the capacitor was measured in the same manner as in Example 1. The porosity, the capacity possessed by the holes having diameter of 5 $\mu$m–70 $\mu$m, the equivalent series resistance and $\omega_L$ are shown in Table 16.

TABLE 16

| No. | Equivalent series resistance (106) | porosity (%) | capacity (cc/g) | $\omega_L$ (mHz) |
|---|---|---|---|---|
| Comp. Ex. 3-1 | 100 | 84 | 2.0 | 30 |
| Comp. Ex. 3-2 | 47 | 9 | 0.0005 | 2 |

Comparative Example 4

Using each of the polarizable electrodes prepared in Comparative Example 3, a positive electrode and a negative electrode were prepared. They were vacuum-impregnated with an aqueous solution containing 30% by weight of sulfuric acid, whereby electric double-layer capacitors were produced. Each capacitor was determined for equivalent series resistance and the frequency $\omega_L$ of the capacitor was measured in the same manner as in Example 1. The results are shown in Table 17. Each capacitor was charged with and discharged a current of 200 A and then was observed. The observation results are shown in Table 18.

TABLE 17

| No. | Equivalent series resistance (m$\Omega$) |
|---|---|
| Comp. Ex. 4-1 | 30 |
| Comp. Ex. 4-2 | 12 |

TABLE 18

| No. | Appearance of electrodes |
|---|---|
| 4-1 | Normal |
| 4-2 | Normal |
| 4-3 | Normal |
| 4-4 | Normal |
| Comp. Ex. 4-1 | Electrodes collapsed into pieces. |
| Comp. Ex. 4-2 | Electrodes collapsed into pieces. |

Comparative Example 5

A phenolic foam having a bulk density of 0.3 g/cm$^3$ and a foam direction perpendicular to the surface of the electrode to be prepared therefrom, was pyrolzed at 1000° C. in a nitrogen gas atmosphere. The pyrolyzing product was kept for 3 hours in a mixture of nitrogen gas and carbon dioxide gas for activation. The activation product was measured for porosity and capacity possessed by the holes having diameter of 5 $\mu$m–70 $\mu$m, by the mercury porosimetry, which were 15% and 2.8 cc/g, respectively. The activation product was cut into a size of 10 mm (diameter)×1 mm (thickness) and bonded to a vitreous carbon (a product of Nisshinbo Industries, Inc.) by the use of a conductive adhesive. The resulting laminate was vacuum-impregnated with a propylene carbonate solution containing 1 mole/liter of tetrabutylammonium perchlorate, whereby an electric double-layer capacitors was produced. The capacitor was determined for equivalent series resistance after 1, 100, 500 and 1,000 cycles in the same manner as in Example 1. The results are shown in Table 19.

TABLE 19

| | Cycles (times) | | | |
|---|---|---|---|---|
| | 1 | 100 | 500 | 1000 |
| Equivalent series resistance ($\Omega$) | 21 | 50 | 153 | 221 |

Comparative Example 6

To each of the two polarizable electrodes prepared in Comparative Example 1, a hole of a size of 5 mm in diameter was made with a drill to prepare two polarizable electrodes. Each electrode was measured for porosity and capacity possessed by the holes having diameter of 5 $\mu$m–70 $\mu$m, by the mercury porosimetry. Each electrode was bonded to a collector electrode (a vitreous carbon produced by Nisshinbo Industries, Inc. was used as the collector) by the use of a conductive adhesive. Using two same such laminates as a positive electrode and a negative electrode, two electric double-layer capacitors were produced. The capacitors were determined for equivalent series resistance and frequency $\omega_L$ of the capacitor in the same manner as in Example 1. The porosity, the capacity possessed by the holes having diameter of 5 μm–70 μm, the equivalent series resistance and $\omega_L$ are shown in Table 20.

TABLE 20

| No. | Equivalent series resistance (Ω) | porosity (%) | capacity (cc/g) | $\omega_L$ (mHz) |
|---|---|---|---|---|
| Comp. Ex. 6-1 | 200 | 85 | 2.5 | 15 |
| Comp. Ex. 6-2 | 500 | 87 | 0 | 1 |

As is clear from the above, the electric double-layer capacitor of the present invention has a sufficiently low internal resistance and yet a long cycle life.

What is claimed is:

1. A polarizable electrode for an electric double-layer capacitor, which comprises a solid activated carbon obtained by pyrolyzing a mixture mainly containing an activated carbon and a thermosetting resin and which has, on the surface and/or inside, holes free from said activated carbon, and wherein holes having a diameter of 5 μm–70 μm possess a capacity of 0.01 cc/g–1.0 cc/g, said electrode having a frequency of $\omega_L$ which corresponds to a shift of impedance character from diffusion impedance region to condenser region of 100 mHz–500 mHz.

2. A polarizable electrode for an electric double-layer capacitor, which comprises a solid activated carbon obtained by pyrolyzing a mixture mainly containing an activated carbon and a thermosetting resin and which has, on the surface and/or inside, holes free from said activated carbon, and wherein holes having a diameter of 5 μm–70 μm possess a capacity of 0.01 cc/g–1.0 cc/g.

3. A polarizable alectrode for an electric double-layer capacitor according to claim 1, wherein said solid activated carbon is obtained by pyrolyzing said mixture mainly containing an activated carbon and a thermosetting resin, in a non-oxidizing atmosphere.

4. A polarizable electrode for an electric double-layer capacitor according to claim 1, having a porosity given by holes as discontinuous portions free from the solid activated carbon of 20–80%.

5. A polarizable electrode for an electric double-layer capacitor according to claim 1, wherein said holes free from the solid activated carbon are throughholes.

6. A polarizable electrode for an electric double-layer capacitor according to claim 1, having discontinuous portions free from the solid activated carbon formed by adding, to said mixture mainly containing an activated carbon and a thermosetting resin, a fiber capable of vaporizing upon heating and then heating a mixture formed by adding said fiber.

7. A polarizable electrode for an electric double-layer capacitor according to claim 6, wherein said fiber capable of vaporizing upon heating is a synthetic fiber or a natural fiber.

8. A polarizable electrode for an electric double-layer capacitor according to claim 7, wherein said fiber capable of vaporizing upon heating is a polyvinyl alcohol, a polyethylene, a polystyrene, a polypropylene, a polyester, a polyethylene glycol or a cellulose.

9. A polarizable electrode for an electric double-layer capacitor, which comprises a solid activated carbon obtained by pyrolyzing a mixture mainly containing an activated carbon and a thermosetting resin and which has, on the surface and/or inside, holes free from said activated carbon, and wherein holes having a diameter of 5 μm–70 μm possess a capacity of 0.01 cc/g–1.0 cc/g and said holes free from said solid activated carbon are holes whose directions are substantially parallel to the surface of the electrode.

10. A polarizable electrode for an electric double-layer capacitor according to claim 1, which comprises a solid activated carbon is obtained by pyrolyzing a mixture mainly containing an activated carbon and a thermosetting resin and which has, on the surface and/or inside, holes free from said activated carbon, and wherein holes having a diameter of 5 μm–70 μm possess a capacity of 0.01 cc/g–1.0 cc/g and said holes free from said solid activated carbon are holes whose directions are substantially perpendicular to the surface of the electrode.

11. An electric double-layer capacitor which comprises at least a pair of polarizable electrodes and an electrolyte impregnated there-between, each of said electrodes comprising a solid activated carbon obtained by activated carbon is obtained by pyrolyzing a mixture mainly containing an activated carbon and a thermosetting resin and having, on the surface and/or inside, holes free from said activated carbon, and wherein holes having a diameter of 5 μm–70 μm possess a capacity of 0.01 cc/g–1.0 cc/g, each of said polarizable electrodes firmly bonded to a collector electrode respectively.

* * * * *